US012011930B2

(12) United States Patent
Namba et al.

(10) Patent No.: US 12,011,930 B2
(45) Date of Patent: Jun. 18, 2024

(54) LIQUID DISCHARGE APPARATUS, IMPRINT APPARATUS, AND DETECTION METHOD

(71) Applicant: CANON KABUSHIKI KAISHA, Tokyo (JP)

(72) Inventors: Hisashi Namba, Tochigi (JP); Noriyasu Hasegawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/493,737

(22) Filed: Oct. 4, 2021

(65) Prior Publication Data

US 2022/0111655 A1 Apr. 14, 2022

(30) Foreign Application Priority Data

Oct. 14, 2020 (JP) ................................ 2020-173536

(51) Int. Cl.
*B41J 2/175* (2006.01)

(52) U.S. Cl.
CPC .................................... *B41J 2/175* (2013.01)

(58) Field of Classification Search
None
See application file for complete search history.

(56) References Cited

U.S. PATENT DOCUMENTS

| | | | | |
|---|---|---|---|---|
| 6,672,704 | B2 * | 1/2004 | Katakura | B41J 2/1652 347/23 |
| 11,097,545 | B2 | 8/2021 | Iimura et al. | B41J 2/16526 |
| 2010/0002206 | A1 * | 1/2010 | Kida | G03F 7/70341 355/30 |
| 2015/0144709 | A1 | 5/2015 | Ishibashi et al. | B05B 15/0406 |
| 2016/0375684 | A1 * | 12/2016 | Murate | B41J 2/04588 347/10 |
| 2017/0363953 | A1 * | 12/2017 | Steinhart | B82Y 10/00 |
| 2021/0060928 | A1 * | 3/2021 | Kuramoto | B41J 2/04571 |

FOREIGN PATENT DOCUMENTS

| | | |
|---|---|---|
| JP | 2001-001534 | 1/2001 |
| JP | 2015-120332 | 7/2015 |

* cited by examiner

*Primary Examiner* — Alejandro Valencia
(74) *Attorney, Agent, or Firm* — Venable LLP

(57) ABSTRACT

There is provided a liquid discharge apparatus. A discharge head is provided with a discharge port that discharges a liquid. A retention portion is facing the discharge head, and retains the liquid between the discharge head and the retention portion. A detection unit detects that the discharge port is covered with the liquid after the liquid is supplied between the discharge head and the retention portion.

18 Claims, 8 Drawing Sheets

LIQUID DISCHARGE APPARATUS, IMPRINT APPARATUS, AND DETECTION METHOD

BACKGROUND OF THE INVENTION

Field of the Invention

The present invention relates to a liquid discharge apparatus, an imprint apparatus, and a detection method.

Description of the Related Art

In a liquid discharge apparatus that discharges a liquid from a discharge head, an operation for recovering the discharge performance may be performed. Japanese Patent Laid-Open No. 2015-120332 discloses that in order to remove a foreign substance adhering in the vicinity of the discharge port, the liquid on the discharge surface is moved to a predetermined collection position. Further, Japanese Patent Laid-Open No. 2001-1534 discloses that in order to prevent clogging of the discharge port and ink flow passage, the discharge port and the ink flow passage are cleaned by filling them with a cleaning liquid.

SUMMARY OF THE INVENTION

According to one embodiment of the present invention, a liquid discharge apparatus comprises: a discharge head provided with a discharge port that discharges a liquid; a retention portion facing the discharge head, and configured to retain the liquid between the discharge head and the retention portion; and a detection unit configured to detect that the discharge port is covered with the liquid after the liquid is supplied between the discharge head and the retention portion.

According to another embodiment of the present invention, an imprint apparatus comprises a liquid discharge apparatus according to the above embodiment, wherein the imprint apparatus performs an imprint process on a substrate by discharging a liquid from the liquid discharge apparatus.

According to still another embodiment of the present invention, detection method comprises: moving a retention portion facing a discharge head and configured to retain a liquid to a retention position where the retention portion can retain the liquid so that the discharge head and/or a discharge port provided in the discharge head is covered with the liquid; supplying the liquid between the discharge head and the retention portion; and detecting that the discharge port is covered with the liquid after the liquid is supplied between the discharge head and the retention portion in the supplying.

Further features of the present invention will become apparent from the following description of exemplary embodiments (with reference to the attached drawings).

DESCRIPTION OF THE EMBODIMENTS

Figure 1:
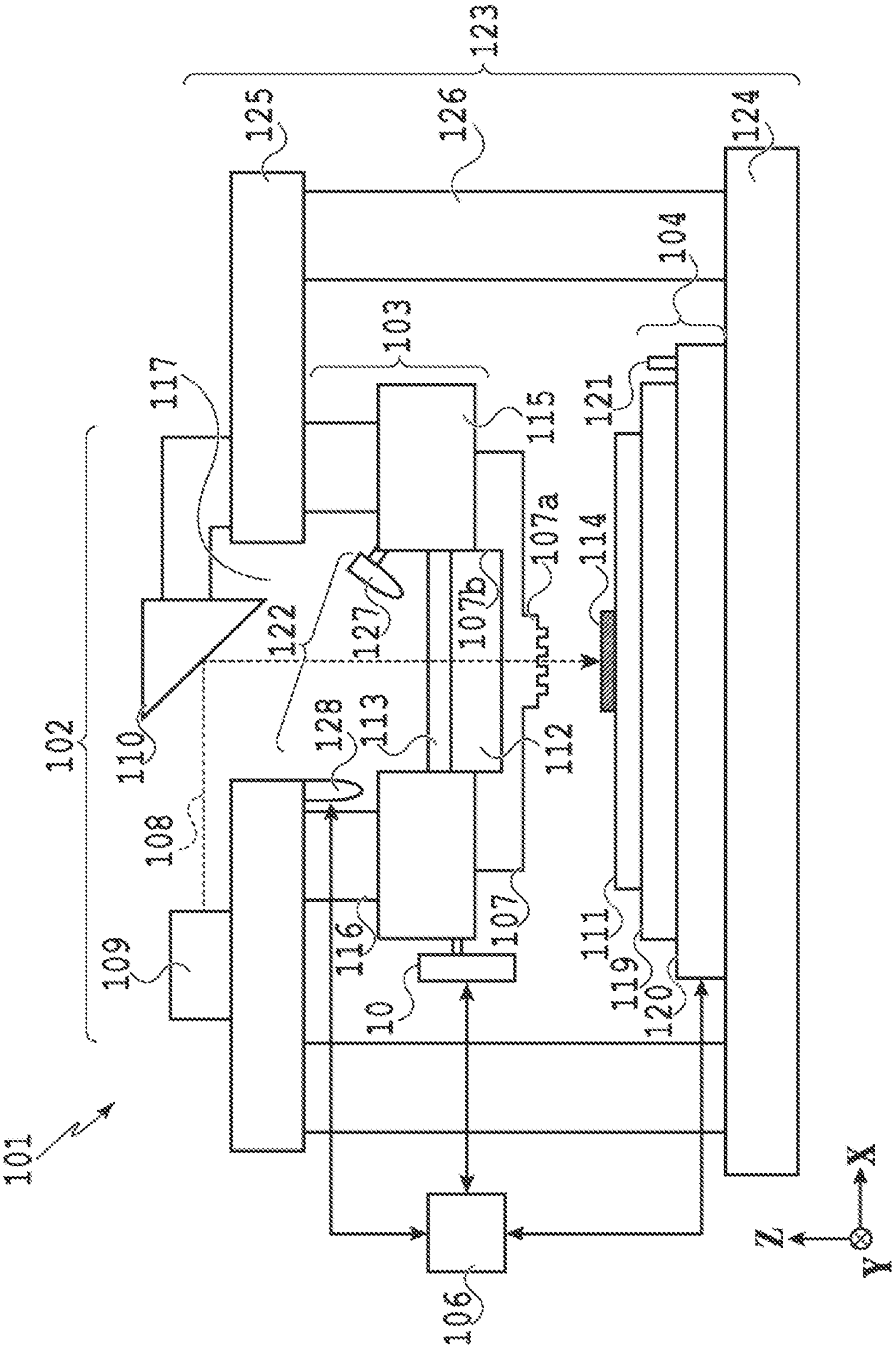
FIG. 1 is a schematic view showing the arrangement of an imprint apparatus according to an embodiment.

As a discharge performance recovery operation, in addition to the above-described prior art, the inside of the flow passage and the discharge port may be cleaned by applying a vibration to the liquid while retaining the liquid in the discharge port surface. Further, when storing a discharge head, in order to prevent drying of the discharge port, the discharge head may be stored while a discharge liquid is stored in a cap so that the discharge liquid is in contact with the surface of the discharge head. In order to perform these operations effectively, it is desirable that the discharge port is reliably covered with the liquid.

Each embodiment of the present invention provides a technique for confirming that the discharge port is covered with the liquid.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in this specification, a "nozzle" generically means a discharge port or a liquid channel communicating with it, and an element for generating energy used to discharge ink, unless otherwise specified.

A substrate for discharge head (head substrate or chip) used below means not merely a base made of a silicon semiconductor, but a configuration in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

First Embodiment

<Outline of Imprint Apparatus>

FIG. 1 is a schematic view showing the arrangement of an imprint apparatus according to an embodiment.

An imprint apparatus 101 shown in FIG. 1 is used in manufacturing various kinds of devices such as a semiconductor device. The imprint apparatus 101 includes a liquid discharge apparatus 10. The liquid discharge apparatus 10 discharges a discharge material (resist) 114 onto a substrate 111. The discharge material 114 is, for example, a light curable resin having a property of being cured by receiving ultraviolet light (UV). The discharge material 114 is appropriately selected in accordance with various kinds of conditions for a semiconductor device manufacturing process and the like. In addition to the light curable resist, for example, a thermosetting resist may be used as the discharge material, and the imprint apparatus may be an apparatus that performs an imprint process by curing the resist with heat. The discharge material 114 may be referred to as an imprint material.

The imprint apparatus 101 performs an imprint process including a series of following processing operations. First, the imprint apparatus 101 causes the liquid discharge apparatus 10 to discharge the discharge material 114 onto the substrate 111. Then, the imprint apparatus 101 presses a mold 107 including a mold pattern against the discharge material 114 discharged onto the substrate and, in this state, cures the discharge material 114 by irradiation of light (ultraviolet light). Thereafter, the mold 107 is separated from the cured discharge material 114. Thus, the pattern of the mold 107 is transferred onto the substrate 111.

The imprint apparatus 101 includes a light irradiation unit 102, a mold holding mechanism 103, a substrate stage 104, the liquid discharge apparatus 10, a control unit 106, a measurement unit 122, and a housing 123.

The light irradiation unit 102 includes a light source 109, and an optical element 110 for correcting ultraviolet light 108 emitted from the light source 109. The light source 109 is, for example, a halogen lamp that generates an i-line or a g-line. The ultraviolet light 108 is applied to the discharge material 114 via the mold 107. The wavelength of the ultraviolet light 108 is a wavelength corresponding to the discharge material 114 to be cured. Note that in a case of an imprint apparatus that uses a thermosetting resist as the resist, a heat source unit for curing the thermosetting resist is installed in place of the light irradiation unit 102.

The mold holding mechanism 103 includes a mold chuck 115 and a mold driving mechanism 116. The mold 107 held by the mold holding mechanism 103 includes a pattern portion **107*a* which has a rectangular outer peripheral shape and in which a concave-convex pattern such as a circuit pattern to be transferred is three-dimensionally formed on the surface facing the substrate 111. The material of the mold 107 in this embodiment is a material capable of transmitting the ultraviolet light 108** and, for example, quartz is used.

The mold chuck 115 holds the mold 107 by vacuum chuck or an electrostatic force.

The mold driving mechanism 116 moves the mold 107 by holding and moving the mold chuck 115. The mold driving mechanism 116 can press the mold 107 against the discharge material 114 by moving the mold 107 in the −Z direction. Further, the mold driving mechanism 116 can separate the mold 107 from the discharge material 114 by moving the mold 107 in the +Z direction. An example of an actuator that can be employed as the mold driving mechanism 116 is, for example, a linear motor or an air cylinder.

Each of the mold chuck 115 and the mold driving mechanism 116 includes an opening region 117 in the central portion. The mold 107 includes a concave-shaped cavity **107*b* in the surface to be irradiated with the ultraviolet light 108. A light transmitting member 113 is provided in the opening region 117 of the mold driving mechanism 116, thereby forming a sealed space 112 surrounded by the light transmitting member 113, the cavity 107*b*, and the opening region 117**.

The pressure in the space 112 is controlled by a pressure correction apparatus (not shown). When the pressure correction apparatus sets the pressure in the space 112 higher than the outside, the pattern portion **107*a* is bent in a convex shape toward the substrate 111. With this, the central portion of the pattern portion 107*a* is brought into contact with the discharge material 114. Accordingly, when the mold 107 is pressed against the discharge material 114, a gas (air) getting trapped between the pattern portion 107*a* and the discharge material 114 is suppressed. Thus, the discharge material 114 can be filled to every corner of the concave-convex portion of the pattern portion 107*a*. The depth of the cavity 107*b* that determines the size of the space 112 is appropriately changed in accordance with the size or material of the mold 107**.

The substrate stage 104 includes a substrate chuck 119, a substrate stage housing 120, and a stage reference mark 121. The substrate 111 held by the substrate stage is a single-crystal silicon substrate or an SOI (Silicon on Insulator) substrate. The discharge material 114 is discharged onto the processed surface of the substrate 111, and the pattern is molded thereon.

The substrate chuck 119 holds the substrate 111 by vacuum chuck. The substrate stage housing 120 moves the substrate 111 by moving the substrate chuck 119 in the X direction and the Y direction while holding the substrate chuck 119 by a mechanical configuration. The stage reference mark 121 is used in alignment between the substrate 111 and the mold 107 to set a reference position of the substrate 111. For example, a linear motor is used as an actuator of the substrate stage housing 120. In addition, the actuator of the substrate stage housing 120 may be configured to include a plurality of driving systems such as a coarse driving system or a fine driving system.

The liquid discharge apparatus 10 discharges the uncured discharge material 114 in a liquid state from nozzles, thereby applying it onto the substrate 111. In this embodiment, a method is employed in which the discharge material 114 is pushed out from a discharge port by utilizing the inverse piezoelectric effect of a piezoelectric element. The control unit 106 to be described later generates a driving waveform for driving the piezoelectric element and applies it to the piezoelectric element, thereby driving the piezoelectric element so as to be deformed into a shape suitable for discharge. A plurality of nozzles are provided, and each nozzle is configured to be independently controllable. The amount of the discharge material 114 discharged from the nozzle of the liquid discharge apparatus 10 is appropriately determined in accordance with the desired thickness of the discharge material 114 to be formed on the substrate 111, the density of the pattern to be formed, or the like.

The measurement unit 122 includes an alignment measuring device 127 and an observation measuring device 128. The alignment measuring device 127 measures the positional shift in the X direction and the Y direction between an alignment mark formed on the substrate 111 and an alignment mark formed in the mold 107. The observation measuring device 128 is, for example, an image capturing apparatus such as a CCD camera. The observation measuring device 128 captures an image of the pattern of the discharge material 114 discharged onto the substrate 111, and outputs it to the control unit 106 as image information.

The control unit 106 controls operations of respective components of the imprint apparatus 101, and the like. The control unit 106 is formed by, for example, a computer including a CPU, a ROM, and a RAM. The control unit 106 is connected to the respective components of the imprint apparatus 101 via lines, and the CPU controls the respective components in accordance with control programs stored in the ROM. Further, the control unit 106 includes a display unit and can perform various kinds of display.

Based on the measurement information of the measurement unit 122, the control unit 106 controls the operations of the mold holding mechanism 103, the substrate stage 104, and the liquid discharge apparatus 10. Note that the control unit 106 may be formed integrally with another portion of the imprint apparatus 101, or may be implemented as another apparatus different from the imprint apparatus. The control unit 106 may be formed by not one computer but a plurality of computers.

The housing 123 includes a base plate 124 on which the substrate stage 104 is placed, a bridge plate 125 to which the mold holding mechanism 103 is fixed, and columns 126 extending from the base plate 124 and supporting the bridge plate 125.

The imprint apparatus 101 further includes a mold conveying mechanism (not shown) that conveys the mold 107 from the outside of the apparatus to the mold holding mechanism 103, and a substrate conveying mechanism (not shown) that conveys the substrate 111 from the outside of the apparatus to the substrate stage 104.

<Liquid Discharge Apparatus>

Figure 2:
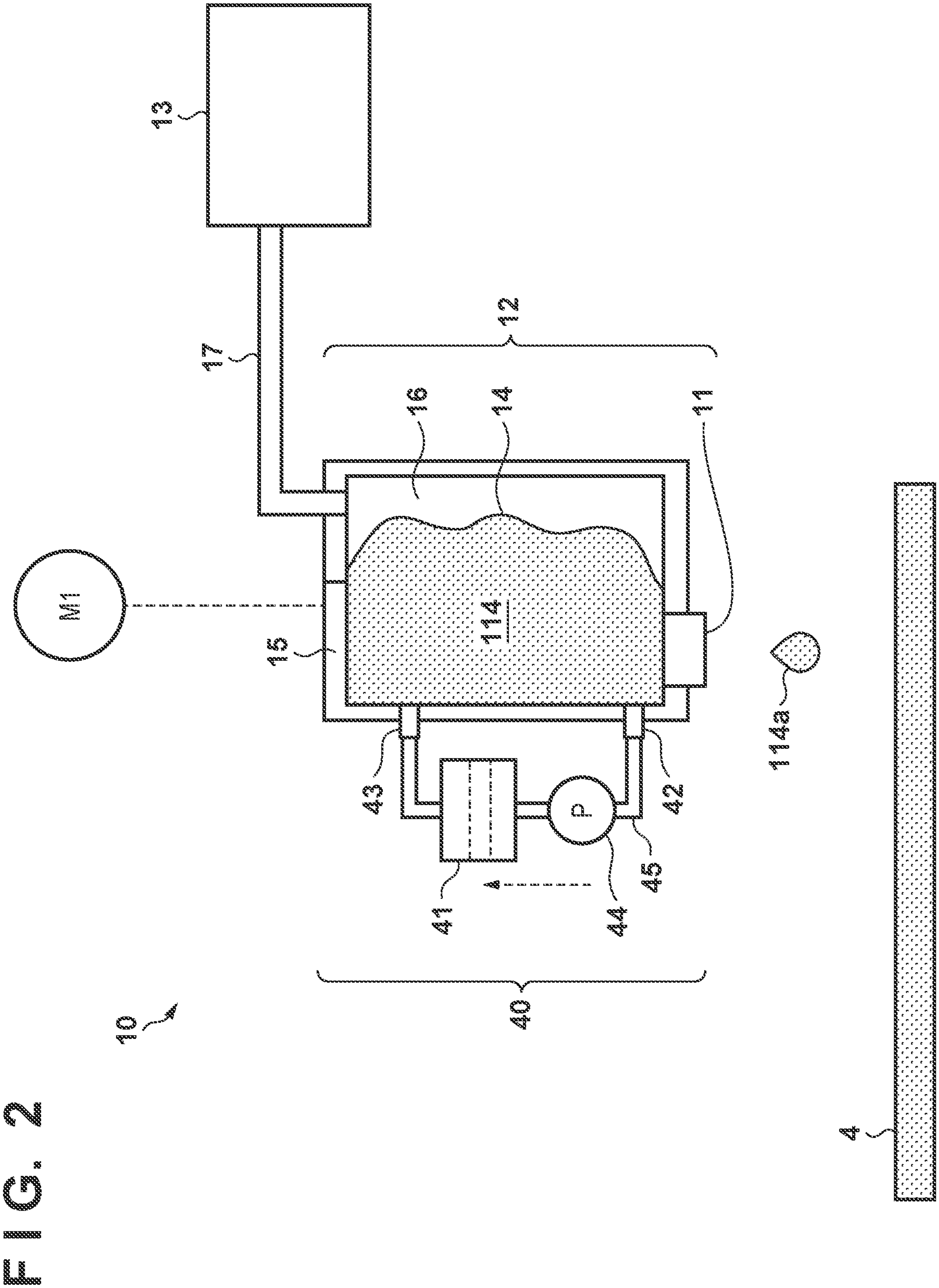
FIG. 2 is a view showing the arrangement of a main part of a liquid discharge apparatus shown in FIG. 1.

FIG. 2 is a view showing the arrangement of a main part of the liquid discharge apparatus 10 shown in FIG. 1. As shown in FIG. 2, the liquid discharge apparatus 10 mainly includes a liquid discharge portion 11 (discharge head) to be described later, a liquid container 12, a pressure control unit 13 for controlling a pressure, and a circulation unit 40 that circulates the discharge material 114 (liquid) inside the liquid discharge portion 11.

The liquid container 12 contains the liquid. A separation film 14, which is made of a flexible material and separates the space inside the container into a first liquid chamber 15 and a second liquid chamber 16, is provided inside the liquid container 12. The thickness of the separation film 14 may be between 10 μm or more and 200 μm or less. The separation film 14 may be made of a material having low permeability with respect to a liquid and a gas. For example, the separation film 14 is formed of a film made of a fluororesin material such as PFA or a composite multilayer film obtained by combining a fluororesin material and a plastic material.

The first liquid chamber 15 is one of the chambers partitioned by the separation film 14, and contains the discharge material 114. The first liquid chamber 15 is connected to the liquid discharge portion 11. The second liquid chamber 16 is the other one of the chambers partitioned by the separation film 14, and contains a filling liquid. The second liquid chamber 16 is connected to the pressure control unit 13 by a connection pipe 17.

The pressure control unit 13 includes a filling liquid tank, a pipe, a pressure sensor, a pump, a valve, and the like, and controls the pressure in the second liquid chamber 16. When the pressure control unit 13 controls the pressure of the filling liquid in the second liquid chamber 16, the pressure of the discharge material 114 in the first liquid chamber 15 is controlled via the separation film 14. With this, the shape of the air-liquid interface in the liquid discharge portion 11 can be stabilized, and the discharge material 114 having good reproducibility as a droplet 114*a* can be discharged onto the substrate 111.

The circulation unit 40 has an arrangement in which a passage 45 connected to the liquid container 12 at both ends is provided outside the liquid container 12 and a filter 41 and a pump 44 are arranged in the passage 45. The circulation unit 40 is connected to the first liquid chamber 15 of the liquid container 12, and the passage 45 communicates with the first liquid chamber 15 through a first opening 42 and a second opening 43 each of which is open to the first liquid chamber 15.

The first opening 42 is an opening for supplying the discharge material 114 inside the first liquid chamber 15 to the inside of the passage 45, and the second opening 43 is an opening for resupplying, to the first liquid chamber 15, the discharge material 114 supplied from the first opening 42 to the passage 45. The pump 44 and the filter 41, which filters the discharge material 114, are provided in the passage 45 connecting the first opening 42 and the second opening 43. In consideration of the possibility of generation of foreign substances in the discharge material 114 caused by dust from the pump 44, the filter 41 is preferably arranged at a position on the downstream side of the pump 44 in the flow of the discharge material 114 from the first opening 42 to the second opening 43.

In this embodiment, the pump 44 is provided in the passage 45, but the pump 44 may be provided outside the passage 45. When the pump 44 is driven, the discharge material 114 contained in the first liquid chamber 15 is supplied from the first opening 42 to the passage 45. The discharge material 114 supplied from the first opening 42 is filtered by the filter 41 by passing through the filter 41 in the passage 45. Thereafter, the discharge material 114 returns to the first liquid chamber 15 via the second opening 43. Then, the discharge material 114 in the first liquid chamber 15 is supplied again to the passage 45 from the first opening 42. That is, the discharge material 114 is filtered by the filter 41 while circulating in the first liquid chamber 15 and the passage 45.

Note that in this embodiment, the liquid discharge apparatus 10 includes the separation film 14 inside the liquid container 12, but an arrangement in which no separation film 14 is provided can also be employed. In this case, the liquid container 12 contains the discharge material.

<Liquid Discharge Portion>

Figure 3:
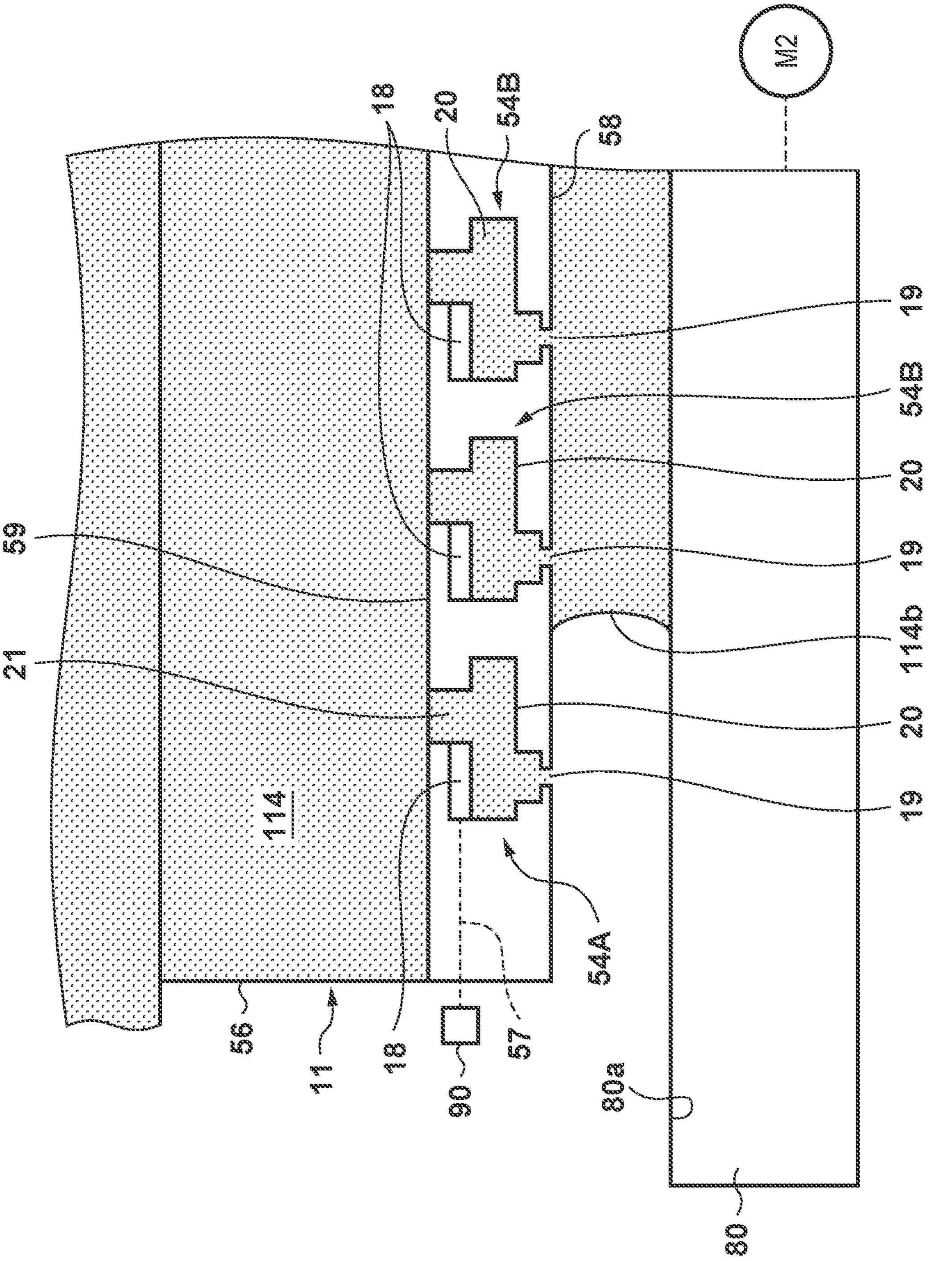
FIG. 3 is an enlarged sectional view showing a liquid discharge portion.

FIG. 3 is an enlarged sectional view showing the liquid discharge portion 11. The liquid discharge portion 11 includes a common liquid chamber 56 and a module board 57.

The common liquid chamber 56 is a liquid chamber for supplying the discharge material 114 to a plurality of nozzles 54 provided in the module board 57.

In the module board 57, there are provided the plurality of nozzles 54, each of which includes a supply port 21 for supplying the discharge material to the module board 57 and a discharge port 19 from which the discharge material can be discharged, and energy generating elements 18, each of which is provided in each nozzle 54 and generates the energy for discharging the discharge material. Here, the surface of the module board 57 provided with the supply ports 21 is referred to as a supply port-side surface 59, and the surface thereof provided with the discharge ports 19 is referred to as a discharge port-side surface 58 or a discharge port surface 58. The opening area of the discharge port 19 is smaller than the opening area of the supply port 21, and the discharge port 19 has the smallest sectional area in the flow passage in the nozzle 54.

In this embodiment, a piezoelectric element is employed as the energy generating element 18. However, a heating resistor or the like can also be used as the energy generating element 18. Since a discharge material containing a large amount of resin is often used in the imprint apparatus 101, a piezoelectric element may be used as the energy generating element. The supply port 21 communicates with the discharge port 19 in the module board 57. When the control unit 106 controls the energy generating element 18, the discharge material 114 in the interior (pressure chamber) 20 of the nozzle between the energy generating element 18 and the discharge port 19, which has been supplied from the common liquid chamber 56 through the supply port 21, is discharged from the discharge port 19 onto the substrate. The liquid discharge portion 11 may be a discharge head used for an inkjet head or the like. Alternatively, supplying the discharge material and stopping the supply thereof may be controlled using a control valve or the like. Note that the number of nozzles 54 can be appropriately set.

The liquid discharge portion 11 is provided so as to be reciprocally moved by a moving mechanism (not shown) using a motor M1 as a driving source. For example, the liquid discharge portion 11 is moved among a standby position, a discharge region where the discharge material 114 is discharged onto the substrate 111, and a recovery position where a recovery operation to be described later is performed. In the discharge region, the liquid discharge portion 11 discharges the discharge material 114 onto the substrate 111 during, for example, scanning in the X direction. As the moving mechanism, a well-known technique such as a rack and pinion mechanism or a ball screw mechanism, which converts the rotational driving force of the motor M1 into a linear motion, can be appropriately employed. A linear motor may be employed as the motor M1.

<Liquid Retention Portion>

The liquid discharge apparatus 10 according to this embodiment includes a liquid retention portion 80 (retention portion). The liquid retention portion 80 retains the liquid such that the discharge port 19 of the nozzle 54 is covered with the liquid. More specifically, by filling the space between the liquid discharge portion 11 and the liquid retention portion 80 with the liquid, the liquid retention portion 80 retains the liquid such that the discharge port 19 is covered with the liquid. In this embodiment, the liquid retention portion 80 is provided so as to be located below the liquid discharge portion 11 when the liquid discharge portion 11 is at the recovery position. Further, a flat facing surface 80*a* is formed at a position of the liquid retention portion 80 facing the discharge port surface 58 when the liquid discharge portion 11 is at the recovery position. At the recovery position, the facing surface 80*a* and the discharge port surface 58 are provided at a predetermined spacing, for example, a spacing of several mm. When the liquid is supplied between the facing surface 80*a* and the discharge port surface 58, a liquid column is formed between them. Thus, the plurality of nozzles 54 are covered with the liquid. In this embodiment, the liquid retained between the facing surface 80*a* and the discharge port surface 58 by the liquid retention portion 80 is the discharge material 114 discharged from the liquid discharge portion 11. Note that a collection portion for collecting the retained liquid may be provided in the liquid retention portion 80.

In this embodiment, the liquid retention portion 80 is movably provided so as to be movable in the vertical direction using a motor M2 as a driving source. The position of the liquid retention portion 80 in the vertical direction may be obtained based on a detection value of an encoder (not shown), which can detect the phase of the motor M2, or the like.

<Detection Unit>

The liquid discharge apparatus 10 includes a detection unit 90. The detection unit 90 detects information as to whether the discharge port 19 is covered with the liquid. In this embodiment, as this information, the detection unit 90 detects a counter electromotive force generated when a driving pulse is applied to the energy generating element 18 to vibrate it. That is, the detection unit 90 can be a voltage sensor, a current sensor, or the like provided so as to correspond to each energy generating element 18. Note that although not shown in FIG. 3, the detection unit 90 is provided for each energy generating element 18.

Detection of the counter electromotive force will be more specifically described. The energy generating element 18 (piezoelectric element) is deformed by application of a voltage, and this deformation causes a change in pressure of the discharge material 114 in the nozzle 54, which allows the discharge material 114 to be discharged. When the energy generating element 18 is forcibly vibrated for discharge, a residual vibration is generated, and a counter electromotive force is generated due to the piezoelectric effect. The detection unit 90 detects the counter electromotive force generated by this residual vibration. Since the counter electromotive force is generated for each energy generating element 18, in other words, for each nozzle 54, the detection unit 90 detects the counter electromotive force for each nozzle 54.

Figure 4:
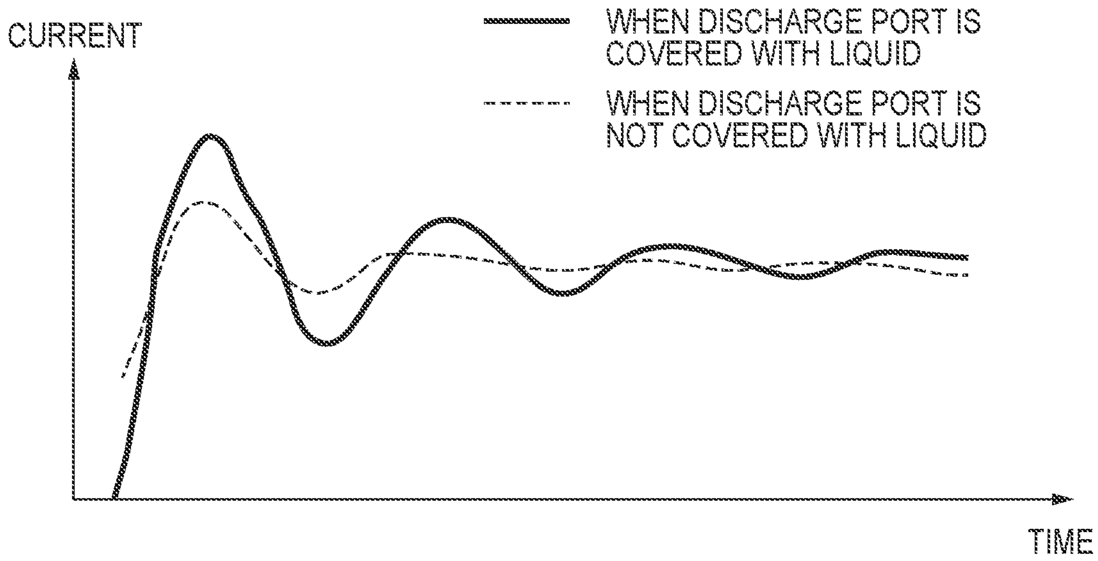
FIG. 4 is a graph showing the waveform of a counter electromotive force obtained by applying a driving pulse to an energy generating element.

With reference to FIGS. 3 and 4, a method of determining, based on the detection result of the detection unit 90, whether the discharge port 19 is covered with the liquid will be described. FIG. 4 shows the waveform of the counter electromotive force obtained by applying a driving pulse to the energy generating element 18 (piezoelectric element).

When determining whether the discharge port 19 is covered with the liquid, a driving pulse which does not cause discharge of the discharge material 114 from the discharge port 19 is applied to the energy generating element 18. For example, if a driving pulse of ±10 V is applied to the energy generating element 18 (piezoelectric element) to discharge the discharge material 114 from the discharge port 19, a driving pulse of ±6 V is applied to the energy generating element 18 (piezoelectric element). FIG. 4 shows the waveform of the counter electromotive force upon determining whether the discharge port 19 is covered with the liquid. The solid line represents the waveform obtained when the discharge port 19 is covered with the liquid, and the dashed line represents the waveform obtained when the discharge port 19 is not covered with the liquid. Referring to FIG. 3, the solid line represents the waveform of the counter electromotive force of the energy generating element 18 of a nozzle 54B whose discharge port 19 is covered with the discharge material 114, and the dashed line represents the waveform of the counter electromotive force of the energy generating element 18 of a nozzle 54A which is not covered with the discharge material 114.

When the discharge port 19 is covered with the discharge material 114, the influence of the meniscus pressure disappears. Therefore, as compared with a case in which the discharge port 19 is not covered with the discharge material 114, the period is longer and the amplitude is also larger. That is, the counter electromotive force waveform of the energy generating element 18 of the nozzle 54B represented by the solid line has a longer period (lower frequency) and a larger amplitude than the counter electromotive force waveform of the energy generating element 18 of the nozzle 54A represented by the dashed line.

Based on the difference as described above, the control unit 106 determines whether all the discharge ports 19 are covered with the discharge material 114. As an example, the control unit 106 stores, in a nonvolatile memory such as a ROM, the information of the counter electromotive force waveform obtained when the discharge port 19 is not covered with the liquid. Then, by comparing the counter electromotive force waveform detected by the detection unit 90 with the information stored in the nonvolatile memory, the control unit 106 determines whether the target discharge port 19 is covered with the liquid.

<Description of Recovery Operation>

The liquid discharge apparatus 10 according to this embodiment can perform a recovery operation for recovering the discharge performance. An example of the recovery operation is cleaning of the discharge port 19 and the interior (pressure chamber) 20 of the nozzle. For example, in a state in which the vicinity of the discharge port 19 is filled with the liquid by using the liquid retention portion 80, the liquid discharge apparatus 10 drives the energy generating element 18 to vibrate the discharge material 114 in the interior (pressure chamber) 20 of the nozzle and the discharge port 19. With this, the interior (pressure chamber) 20 of the nozzle and the discharge port 19 are cleaned.

When filling the vicinity of the discharge port 19 with the liquid, it is conceivable to drive the energy generating element 18 to discharge the discharge material 114 from the discharge port 19. At this time, the responsiveness of the pressure in the interior (pressure chamber) 20 of the nozzle to the energy generating element 18 may change due to mixing of bubbles into the flow passage in the nozzle 54 or expansion of the tube. Further, since there are individual differences among the elements constituting the nozzles 54, the discharge amount of the discharge material 114 may not be constant even if a pressure is applied to the interior (pressure chamber) 20 of each nozzle under a certain condition. The spread of the liquid retained on the discharge port surface 58 may also change depending on the individual differences and the condition. Therefore, even if a certain amount of liquid is supplied between the liquid retention portion 80 and the discharge port surface 58, the cleaning target nozzle may not be covered with the liquid. Even if the liquid is vibrated in this state, the sufficient cleaning effect may not be obtained for the target nozzle.

To prevent this, in this embodiment, the recovery operation is performed after determining, by the following processing, whether the discharge port 19 is covered with the liquid.

Figure 5:
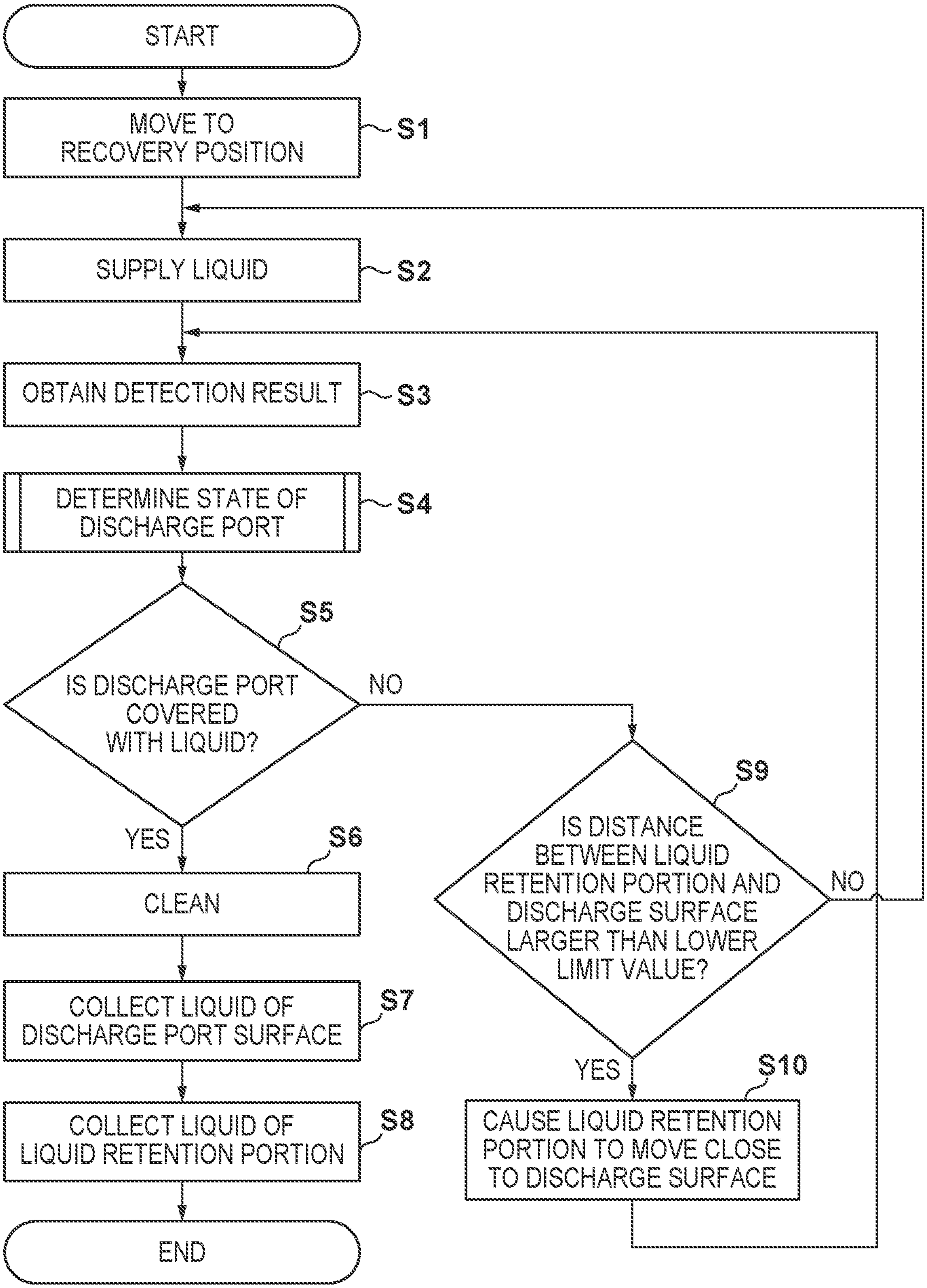
FIG. 5 is a flowchart illustrating a control example of a control unit.

FIG. 5 is a flowchart illustrating a control example of the control unit 106. FIG. 5 illustrates the control example for a cleaning operation of the liquid discharge portion 11 as the recovery operation. For example, this flowchart is implemented by the CPU of the control unit 106 loading a program stored in the ROM of the control unit 106 into the RAM of the control unit 106 and executing it. Further, for example, this flowchart is started when a cleaning operation execution instruction is accepted from a user. Furthermore, for example, this flowchart is periodically executed at a predetermined cycle.

In step S1 (to be simply referred to as "S1" hereinafter, and the same applies to the other steps), the control unit 106 moves the liquid discharge portion 11 and/or the liquid retention portion 80 to the recovery position. The recovery position is a position where the recovery operation can be performed, and in this embodiment, it can be a position where the liquid retention portion 80 can retain the liquid such that the liquid covers the discharge port 19. That is, it can also be said that the recovery position is the position where the liquid retention portion 80 retains the liquid. In this embodiment, the liquid discharge portion 11 is moved to a predetermined recovery position. However, the liquid retention portion 80 may be moved, or both the liquid discharge portion 11 and the liquid retention portion 80 may be moved.

In S2, the control unit 106 supplies the liquid between the liquid discharge portion 11 and the liquid retention portion 80. For example, the control unit 106 controls the pressure of the filling liquid in the second liquid chamber 16 by the pressure control unit 13 to discharge the discharge material 114 from the discharge port 19, thereby filling the space between the liquid retention portion 80 and the discharge port surface 58 with the liquid. The liquid supply amount at this time is adjusted such that a bridge 114*b* (liquid column) is formed between the liquid retention portion 80 and the discharge port surface 58.

In S3, the control unit 106 obtains the detection result of the detection unit 90. In this embodiment, the control unit 106 applies, to the energy generating element 18 of each nozzle 54, a driving pulse having a voltage that does not cause discharge of the discharge material 114, and obtains the waveform of the counter electromotive force generated at this time from the detection unit 90 as the detection result.

In S4, the control unit 106 determines the state of the discharge port 19. In this embodiment, the control unit 106 determines whether the discharge port 19 is covered with the liquid. A specific processing example will be described later (see FIG. 6).

In S5, the control unit 106 checks whether the discharge port 19 is covered with the liquid. If the discharge port 19 is covered with the liquid, the process advances to S6; otherwise, the process advances to S9. Note that in this embodiment, the process advances to S6 if all the discharge ports 19 are covered with the liquid, and the process advances to S9 if any of the discharge ports 19 is not covered with the liquid.

In S6, the control unit 106 performs cleaning of the nozzle 54 as the recovery operation. The control unit 106 vibrates the discharge material 114 in the interior (pressure chamber) 20 of the nozzle and the discharge material 114 covering the discharge port 19 by driving the energy generating element, thereby cleaning the interior (pressure chamber) 20 of the nozzle and the discharge port 19.

In S7, the control unit 106 collects the liquid on the discharge port surface 58. More specifically, the control unit 106 lowers the liquid retention portion 80 to increase the spacing between the discharge port surface 58 and the liquid retention portion 80, thereby canceling the bridge 114*b* formed between the liquid retention portion 80 and the discharge port surface 58. When the bridge 114*b* is canceled, the liquid covering the discharge port surface 58 moves downward due to the gravity, and is retained on the side of the liquid retention portion 80. Note that after the bridge is canceled, the liquid remaining on the discharge port surface 58 may be collected using a wiper (not shown) or the like.

In S8, the control unit 106 collects the liquid on the liquid retention portion 80. For example, the control unit 106 collects the liquid remaining on the liquid retention portion 80 by a liquid collection portion (not shown). The liquid collection portion may be formed by a drain port for draining the liquid from the facing surface 80*a*, and a valve or the like that can switch whether to drain the liquid from the drain port. The liquid drained from the drain port is introduced into, for example, a waste liquid tank (not shown) or the like.

On the other hand, if the process advances from S5 to S9, the control unit 106 checks in S9 whether the distance between the liquid retention portion 80 and the discharge port surface 58 is larger than a lower limit value. The control unit 106 advances to S10 if the distance is larger than the lower limit value; otherwise, the control unit 106 returns to the processing in S2. In this embodiment, the lower limit value of the distance between the liquid retention portion 80 and the discharge port surface 58 is provided. This lower limit value of the distance is provided to avoid that the liquid retention portion 80 and the discharge port surface 58 come too close to each other because the discharge port surface 58 may be damaged if the liquid retention portion 80 and the discharge port surface 58 come into contact with each other. The control unit 106 may obtain the distance between the liquid retention portion 80 and the discharge port surface 58 from the detection result of a distance measuring sensor that can optically measure the distance therebetween. Alternatively, the control unit 106 may obtain the height of the liquid retention portion 80 based on the detection result of an encoder that detects the phase of the motor M2, which vertically moves the liquid retention portion 80, and obtain the distance between the liquid retention portion 80 and the discharge port surface 58 based on the obtained height of the liquid retention portion 80.

In S10, the control unit 106 brings the liquid retention portion 80 closer to the discharge port surface 58. The control unit 106 brings the liquid retention portion 80 closer to the discharge port surface 58 within a range in which the distance between the liquid retention portion 80 and the discharge port surface 58 does not become smaller than the lower limit value. As the distance between the liquid retention portion 80 and the discharge port surface 58 decreases, the volume of the space between them becomes smaller. Thus, the discharge port 19 is more likely to be covered with the liquid. Then, the process returns to S3, and the processing is repeated until the target discharge port 19 is covered with the liquid.

On the other hand, if it is determined NO in S9, the liquid retention portion 80 and the discharge port surface 58 cannot be brought closer to each other because there is a risk of contact if the liquid retention portion 80 and the discharge port surface 58 are brought closer to each other. Therefore, the control unit 106 returns to S2 and supplies the liquid again, thereby covering the discharge port 19 with the liquid.

Figure 6:
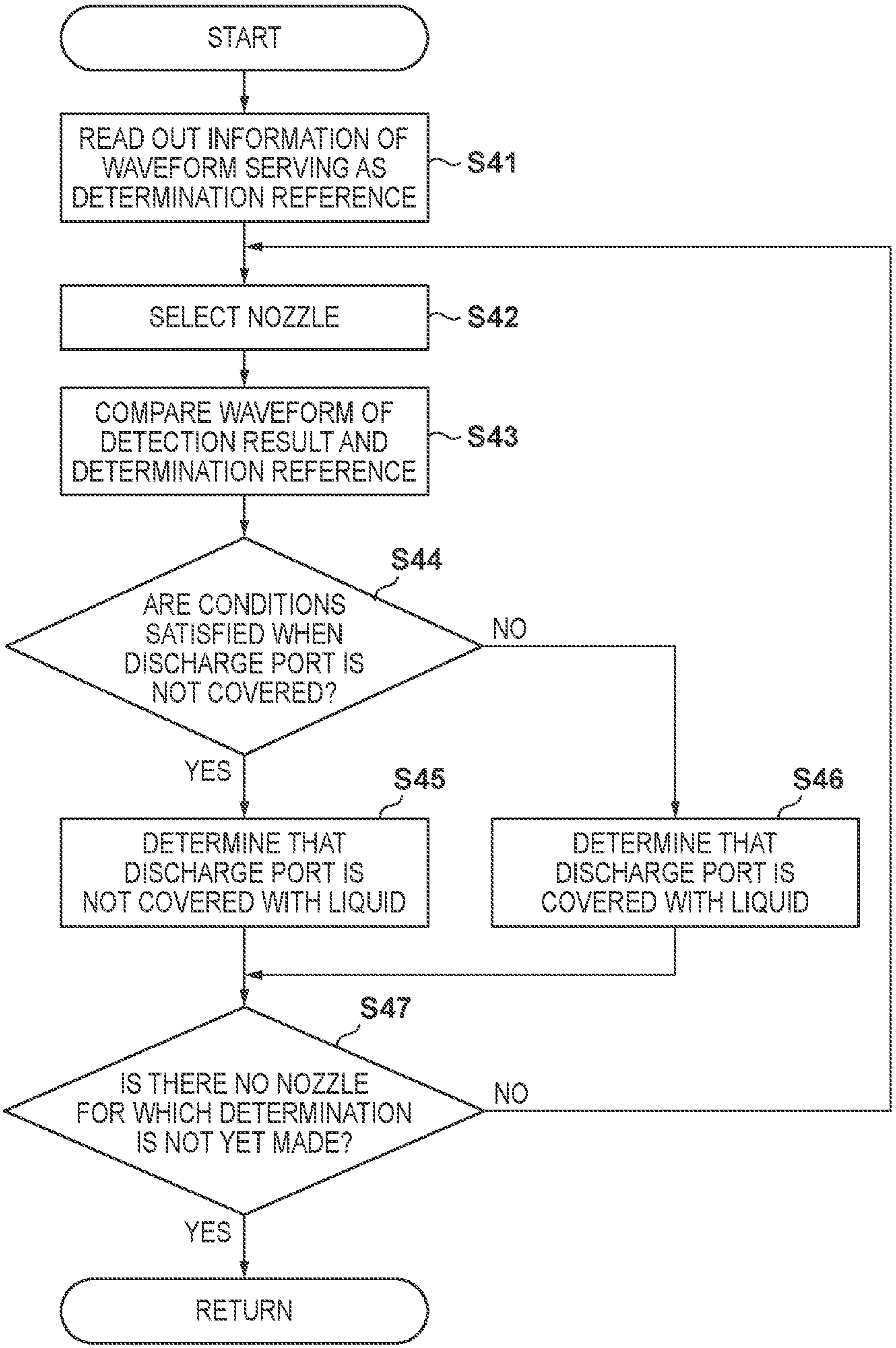
FIG. 6 is a flowchart illustrating the control example of the control unit.

FIG. 6 is a flowchart illustrating a specific example of the processing in S4 of FIG. 5.

In S41, the control unit 106 reads out the information of the waveform serving as a determination reference. For example, the CPU of the control unit 106 reads out the information of the waveform serving as the determination reference stored in a nonvolatile memory such as the ROM of the control unit 106. In this embodiment, the information of the waveform serving as the determination reference is the information of the counter electromotive force waveform of the energy generating element 18 obtained when the discharge port 19 is not covered with the liquid. However, the information of the counter electromotive force waveform of the energy generating element 18 obtained when the discharge port 19 is covered with the liquid may be used as the information of the waveform serving as the determination reference.

In S42, the control unit 106 selects the determination target nozzle 54. In this embodiment, for all the nozzles 54, it is determined whether its discharge port 19 is covered with the liquid. Therefore, the control unit 106 selects any one of the nozzles 54 for which the determination has not been made.

In S43, the control unit 106 compares the detection result of the detection unit 90 with the waveform serving as the determination reference. More specifically, the control unit 106 compares the information of the counter electromotive waveform of the energy generating element 18 of the nozzle 54 selected in S42, which has been detected by the detection unit 90, with the information of the waveform serving as the determination reference read out in step S41. Examples of comparison contents include the amplitude, period, frequency, and the like of the counter electromotive force waveform. For example, the control unit 106 obtains, as a comparison result, information about the difference in amplitude and/or period between the waveform of the detection result and the waveform of the determination reference.

In S44, it is checked whether the comparison result in S43 satisfies the condition for the case in which the discharge port 19 is not covered with the liquid. The process advances to S45 if the condition is satisfied, and the process advances to S46 if the condition is not satisfied. For example, the condition for the case in which the discharge port 19 is not covered with the liquid is that the difference in amplitude and/or period between the waveform of the determination reference and the waveform of the detection result is equal to or larger than a threshold value.

If the process advances to S45, the control unit 106 determines that the discharge port 19 is not covered with the liquid, and advances to S47. On the other hand, if the process advances to S46, the control unit 106 determines that the discharge port 19 is covered with the liquid, and advances to S47.

In S47, if there is no nozzle 54 for which the determination as to whether the discharge port 19 is covered with the liquid has not been made, the control unit 106 terminates this flowchart. If there is the nozzle 54 for which the determination as to whether the discharge port 19 is covered with the liquid has not been made, the control unit 106 returns to S42.

As has been described above, in this embodiment, it is possible to confirm that all the discharge ports 19 are covered with the liquid. Since the cleaning operation is performed after it is confirmed that all the discharge ports 19 are covered with the liquid, it is possible to reliably clean all the nozzles 54.

Note that if it is repeatedly determined NO in S5 a predetermined number of times, for example, two to five times, that is, if it is determined a plurality of times that not all the nozzles 54 are covered with the liquid, this flowchart may be terminated and an error may be notified to the user.

Further, in this embodiment, in order to clean all the nozzles 54, it is confirmed that all the discharge ports 19 are covered with the liquid. However, if one or a plurality of specific nozzles 54 are to be cleaned, the state of only the nozzle 54 to be cleaned may be determined in the processing of S4, and it may be checked in S5 whether the discharge port 19 of the nozzle 54 to be cleaned is covered with the liquid.

When all the nozzles 54 are to be cleaned, a condition may be set such that the control unit 106 advances to S6 even if the discharge port 19 of any of the nozzles 54 is not covered with the liquid. For example, the control unit 106 determines the state of the discharge port 19 of each nozzle 54 in S4, and if the ratio of the nozzles 54 whose discharge ports 19 are covered with the liquid is equal to or higher than a threshold value, the control unit 106 may determine that the discharge ports 19 of most nozzles 54 are covered with the liquid, and advance to S6 to perform cleaning. For example, if the discharge ports 19 of the nozzles 54 of 90% or more are covered with the liquid, the control unit 106 may advance to S6.

In this embodiment, the detection unit 90 that detects the information as to whether the discharge port 19 is covered with the liquid detects the convert electromotive force of the energy generating element 18 (piezoelectric element). As the detection unit 90, an image capturing device such as a camera that captures the image of the discharge port 19 from the lower side via a transmissive portion provided in the liquid retention portion 80 may be employed. The transmissive portion of the liquid retention portion 80 forms a part or all of the liquid retention portion 80, and can be formed of, for example, silica glass or the like. Further, in this case, an illumination system having a wavelength insensitive to the discharge material 114 may be provided. Then, light may be emitted from the illumination system, and the image capturing device may detect the filling state of the liquid via a transparent member.

In this embodiment, in the cleaning operation, the energy generating element 18 that causes discharge of the discharge material 114 is used to vibrate the liquid inside the nozzle 54 and on the surface of the discharge port 19. That is, the energy generation element 18 functions as a component for performing cleaning (recovery operation) of the discharge port 19. However, a component other than the energy generating element 18 may be used to perform the recovery operation. For example, a vibrating unit (not shown) capable of vibrating the liquid retention portion 80 may be provided, and the vibrating unit may vibrate the liquid in the interior (pressure chamber) 20 of the nozzle and the discharge port 19 by vibrating the liquid retention portion 80. Alternatively, a vibrating unit that vibrates the liquid discharge portion 11 may be provided separately from the energy generating element 18.

In this embodiment, the discharge material 114 is discharged from the discharge port 19 to supply the liquid between the liquid retention portion 80 and the discharge port surface 58. However, a supply port (not shown) and a flow passage connecting to the supply port may be provided in the liquid retention portion 80, and the discharge material 114 or a liquid containing some components of the discharge material 114 may be supplied.

The liquid retention portion 80 is not necessarily provided in the liquid discharge apparatus 10, but may be installed in the apparatus when performing the recovery operation.

Second Embodiment

In the first embodiment, in order to effectively perform the recovery operation of the nozzle 54, it is checked whether the discharge port 19 is covered with the liquid. In the second embodiment, in order to suppress drying of a nozzle 54 during storage of a liquid discharge apparatus 10, it is checked whether a discharge port 19 is covered with a liquid. In the following description, components similar to those in the first embodiment have the same reference numerals, and a description thereof will be omitted.

Figure 7:
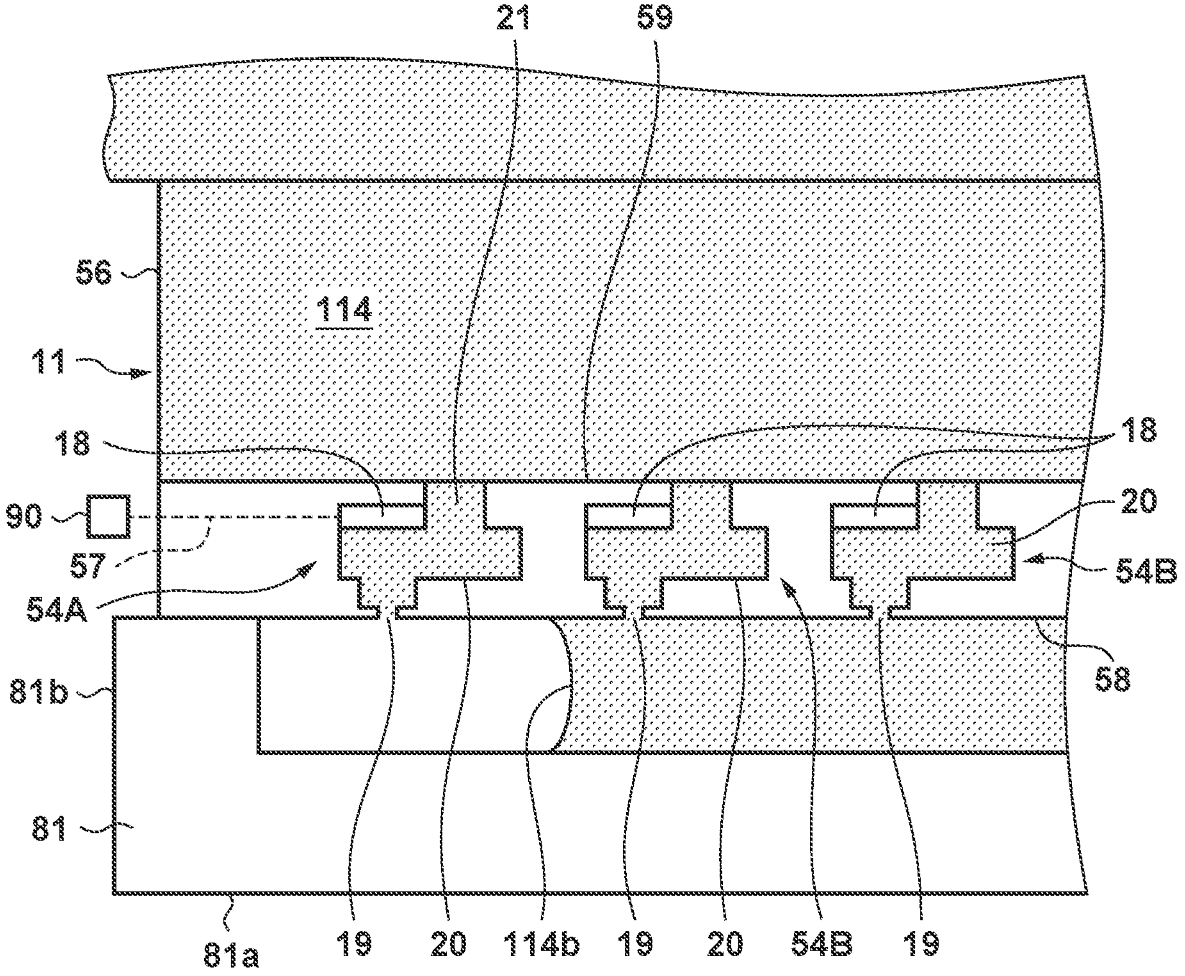
FIG. 7 is an enlarged view of a liquid discharge portion according to another embodiment.

FIG. 7 is an enlarged view of a liquid discharge portion 11 according to the second embodiment. FIG. 7 shows a state in which a liquid retention portion 81 used as a storage cap is attached to the liquid discharge portion 11.

The liquid retention portion 81 is attached so as to cover a discharge port surface 58 to protect the nozzle 54 and suppress drying of the nozzle 54 during storage or transportation of the liquid discharge apparatus 10. In this embodiment, the liquid retention portion 81 is detachably attached during storage of the liquid discharge apparatus 10 or the like. That is, the liquid retention portion 81 is provided separately from the liquid discharge apparatus 10. The liquid retention portion 81 includes a bottom wall portion 81*a* facing the discharge port surface 58 and a side wall portion 81*b* extending upward from the bottom wall portion 81*a*. The side wall portion 81*b* abuts against a position of the discharge port surface 58 where no discharge port 19 is formed. With this, while retaining a liquid between the liquid retention portion 81 and the discharge port surface 58, it is possible to suppress overflowing of the retained liquid when the liquid discharge apparatus 10 vibrates during transportation or the like.

Here, when storing or transporting the liquid discharge apparatus 10, in order to prevent drying of the nozzle 54, the liquid discharge apparatus 10 is stored or transported in a state in which a discharge material 114 is stored on the liquid retention portion 81 serving as the cap so that the discharge port 19 is covered with the discharge material 114. On the other hand, since the user cannot actually see the state after the discharge material 114 is stored on the liquid retention portion 81, it is impossible to determine whether all the nozzles are covered with the discharge liquid.

If the discharge port 19 is left for a long time without being covered with the discharge material 114 like a nozzle 54A, the discharge material 114 in the vicinity of the discharge port 19 is dried, and a residue may adhere to the vicinity of the discharge port 19. Therefore, if the liquid discharge apparatus 10 does not operate for a long time such as during storage or transportation, it is desirable that the discharge ports 19 of all the nozzles 54 are reliably covered with the discharge material 114. Thus, in this embodiment, by the following processing, it is confirmed that the discharge ports 19 are covered with the liquid during storage.

Figure 8:
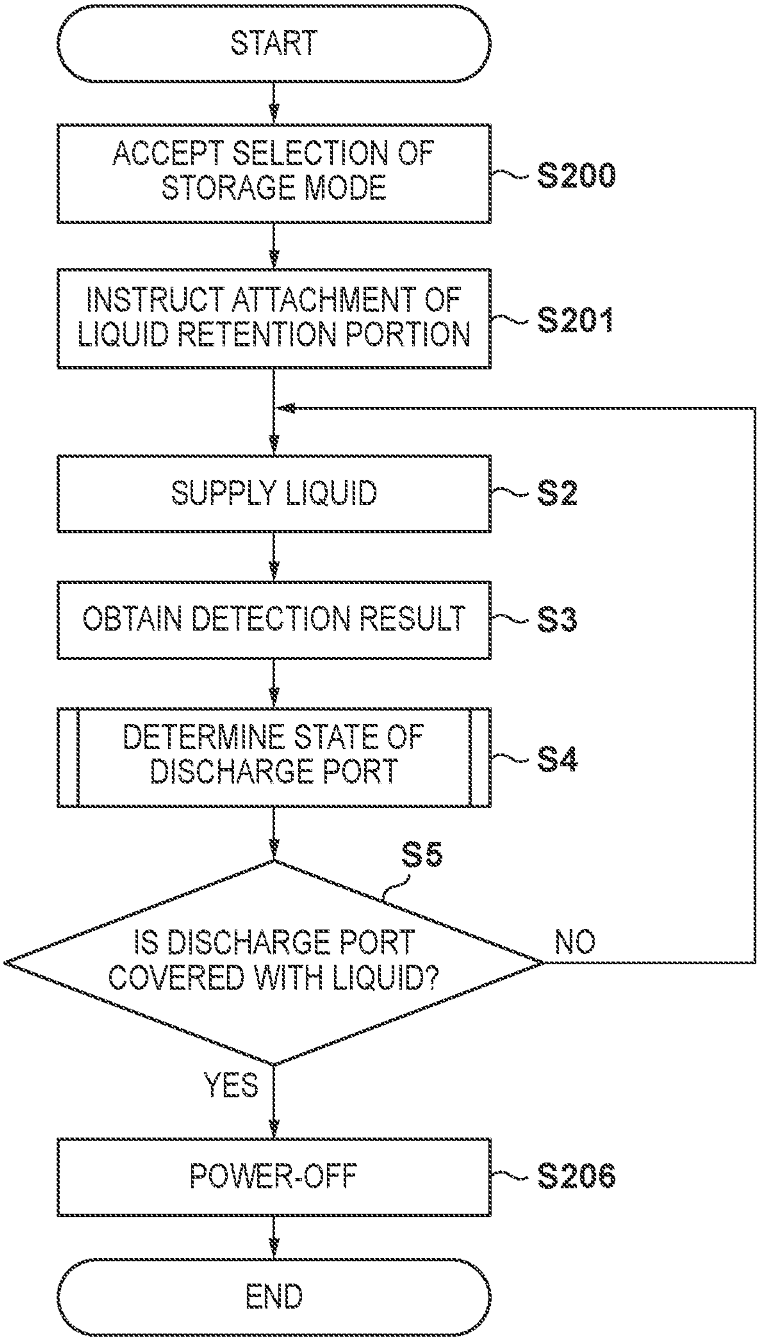
FIG. 8 is a flowchart illustrating a control example of a control unit.

FIG. 8 is a flowchart illustrating a control example of a control unit 106. FIG. 8 illustrates the control example for a confirming operation of the state of the discharge port 19 upon storing the liquid discharge apparatus 10. Note that steps similar to those in the flowchart of FIG. 5 have the same step numbers, and a description thereof will be omitted.

In S200, the control unit 106 accepts a selection of a storage mode. For example, the control unit 106 accepts the selection of the storage mode via an input unit (not shown) or the like that can accept a user instruction. In this embodiment, the storage mode is a mode in which, when the liquid discharge apparatus 10 is not used for a long time, in order to maintain the discharge performance or the like, a predetermined process is performed before power-off.

In S201, the control unit 106 gives an attachment instruction of the liquid retention portion 81. For example, the control unit 106 gives the attachment instruction by displaying a message such as "attach the cap to the nozzles" on a display unit (not shown) such as a liquid crystal display capable of displaying various kinds of information. If an input indicating that attachment of the liquid retention portion 81 is completed is accepted via the input unit (not shown) or the like, the control unit 106 advances to S2.

S2 to S5 are similar to those in the flowchart of FIG. 5. Note that in this embodiment, the liquid retention portion 81 is not configured to be vertically movable. Therefore, if it is determined NO in S5, the process directly returns to S2.

In S206, the control unit 106 powers off the liquid discharge apparatus 10. In this embodiment, the control unit 106 can perform power control for powering off the liquid discharge apparatus 10. If it is determined YES in S5, that is, if all the nozzles 54 or a predetermined nozzle 54 is covered with the liquid, the liquid discharge apparatus 10 is powered off.

In this embodiment, during storage or the like of the liquid discharge apparatus 10, the liquid discharge apparatus 10 is powered off after it is confirmed that the discharge port 19 is covered with the liquid. Therefore, it is possible to suppress drying of the nozzle 54 during storage or the like.

Note that the arrangement according to the first embodiment and the arrangement exemplified as a modification thereof can be appropriately combined with the arrangement according to the second embodiment and the arrangement exemplified as a modification thereof.

In the above-described embodiment, an imprint apparatus is employed as the liquid discharge apparatus 10, but another apparatus such as an inkjet printing apparatus may be employed as the liquid discharge apparatus 10.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. <KR>

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-173536, filed Oct. 14, 2020, which is hereby incorporated by reference herein in its entirety.

What is claimed is:

1. A liquid discharge apparatus comprising:

a discharge head provided with a plurality of discharge ports, each discharge port being provided with a piezoelectric element and configured to discharge a liquid to a target by applying a first driving signal to the piezoelectric element in a discharge operation;

a cap facing the discharge head, and configured to retain the liquid between the discharge head and the cap;

a supply unit configured to supply the liquid between the discharge head and the cap;

a detection unit including at least one voltage sensor and configured to detect a counter electromotive force of each piezoelectric element; and a control unit configured to determine whether each discharge port is covered with the liquid based on detection results of the detection unit in a case in which a second driving signal which is different from the first driving signal is applied to each piezoelectric element, wherein after the supply unit supplies the liquid between the discharge head and the cap, the supply unit resupplies the liquid between the discharge head and the cap if the control unit determines that a predetermined discharge port among the plurality of discharge ports is not covered with the liquid.

2. The apparatus according to claim 1, wherein the control unit determines, based on an amplitude, a period, and/or a frequency of a waveform of the counter electromotive force detected by the detection unit, whether each discharge port is covered with the liquid.

3. The apparatus according to claim 2, further comprising a storage unit configured to store a reference waveform, wherein the control unit determines whether each discharge port is covered with the liquid by comparing the waveform of the counter electromotive force detected by the detection unit with the reference waveform stored in the storage unit.

4. The apparatus according to claim 1, further comprising a recovery unit configured to perform a recovery operation of the plurality of discharge ports if the control unit determines that the predetermined discharge port is covered with the liquid.

5. The apparatus according to claim 1, wherein the piezoelectric element functions as a recovery unit that performs a recovery operation of a corresponding discharge port if the control unit determines that the predetermined discharge port is covered with the liquid.

6. The apparatus according to claim 1, further comprising a moving unit configured to move the discharge head and/or the cap to a position where the cap can retain the liquid between the discharge head and the cap.

7. The apparatus according to claim 1, wherein the retention portion is detachably attached when the liquid discharge apparatus is stored.

8. The apparatus according to claim 7, further comprising:

a power control unit configured to power off the liquid discharge apparatus if it is determined that the discharge port is covered with the liquid.

9. The apparatus according to claim 1, wherein the cap retains the liquid such that the liquid discharged from the discharge port covers the discharge port.

10. The apparatus according to claim 1, further comprising a liquid container configured to contain the liquid discharged from the plurality of discharge ports, wherein the supply unit supplies the liquid to the cap through the plurality of discharge ports by controlling pressure in the liquid container.

11. An imprint apparatus that comprises a liquid discharge apparatus defined in claim 1, wherein the imprint apparatus performs an imprint process on a substrate by discharging a liquid from the liquid discharge apparatus.

12. A detection method comprising:

moving a cap portion facing a discharge head with a plurality of discharge ports and configured to retain a liquid to a retention position where the cap can retain the liquid so that the discharge head and/or a discharge port provided in the discharge head is covered with the liquid, each discharge port being provided with a piezoelectric element and configured to discharge the liquid to a target by applying a first driving signal to the piezoelectric element in a discharge operation;

supplying the liquid between the discharge head and the cap;

detecting a counter electromotive force of each piezoelectric element by a detection unit including at least one voltage sensor; and determining whether each discharge port is covered with the liquid based on detection results of the detection unit in a case in which a second driving signal which is different from the first driving signal is applied to each piezoelectric element, after the supplying, resupplying the liquid between the discharge head and the cap if it is determined in the determining that a predetermined discharge port among the plurality of discharge ports is not covered with the liquid.

13. The apparatus according to claim 1, wherein the discharge head includes a discharge port surface on which the plurality of discharge ports are formed, and the cap includes a portion configured to abut against the discharge port surface.

14. The apparatus according to claim 1, wherein the target is a substrate.

15. The apparatus according to claim 1, further comprising a recovery unit configured to perform a recovery operation of the plurality of discharge ports in a recovery period, wherein the discharge operation is not performed in the recovery period, the cap is configured to retain the liquid between the discharge head and the cap in the recovery period, and the control unit determines whether the predetermined discharge port is covered with the liquid in the recovery period.

16. The apparatus according to claim 1, wherein the second driving signal has a lower voltage than the first driving signal.

17. The apparatus according to claim 1, wherein the control unit brings the cap closer to the plurality of discharge ports before the supply unit resupplies the liquid if the control unit determines that the predetermined discharge port among the plurality of discharge ports is not covered with the liquid.

18. The apparatus according to claim 1, wherein the detection unit includes a plurality of voltage sensors, each of which corresponds to one piezoelectric element.

* * * * *